United States Patent
Las et al.

[11] Patent Number: 5,983,558
[45] Date of Patent: Nov. 16, 1999

[54] INSECT BAIT STATION AND METHOD OF TREATING INSECTS WITH TOXICANT

[75] Inventors: Allan S. Las; Joseph T. Mares, both of Valdosta, Ga.

[73] Assignee: Griffin Corporation, Valdosta, Ga.

[21] Appl. No.: 08/290,590

[22] Filed: Aug. 15, 1994

[51] Int. Cl.[6] .................................................. A01M 1/20
[52] U.S. Cl. ............................................................ 43/131
[58] Field of Search .............................. 43/107, 121, 131, 43/132.1, 124

[56] References Cited

U.S. PATENT DOCUMENTS

| | | |
|---|---|---|
| 552,644 | 1/1896 | Mattews . |
| 1,573,278 | 2/1926 | Schlesinger . |
| 1,887,771 | 5/1932 | Marsh . |
| 2,837,861 | 6/1958 | Graham . |
| 4,281,471 | 8/1981 | Jenkins ...................................... 43/131 |
| 4,485,582 | 12/1984 | Morris . |
| 4,541,199 | 9/1985 | Rudinger ................................... 43/131 |
| 4,563,836 | 1/1986 | Woodruff et al. . |
| 4,662,104 | 5/1987 | Mather ...................................... 43/124 |
| 4,663,882 | 5/1987 | Koljonen ................................... 43/131 |
| 4,709,504 | 12/1987 | Andric ....................................... 43/121 |
| 4,761,912 | 8/1988 | Dyer et al. . |
| 4,793,093 | 12/1988 | Gentile . |
| 4,823,506 | 4/1989 | Demarest et al. . |
| 4,837,969 | 6/1989 | Demarest . |
| 4,841,669 | 6/1989 | Demarest et al. . |
| 4,908,976 | 3/1990 | Dagenais ................................... 43/121 |
| 4,970,822 | 11/1990 | Sherman .................................... 43/131 |
| 5,033,229 | 7/1991 | Demarest et al. . |
| 5,042,194 | 8/1991 | Cohen ....................................... 43/107 |
| 5,182,879 | 2/1993 | Hopkins .................................... 43/131 |
| 5,189,831 | 3/1993 | Miller ....................................... 43/121 |
| 5,427,784 | 6/1995 | Turner ..................................... 43/132.1 |

*Primary Examiner*—Kurt Rowan
*Attorney, Agent, or Firm*—Jones & Askew

[57] ABSTRACT

There is disclosed an improved insect bait station and a method of treating insects with a toxicant. The improved insect bait station comprises a body member, the body member defining a bait area within the body member and an opening in the body member so that insects can enter the body member and feed on an attractant bait in the bait area. The insect bait station further comprises a toxicant applicator disposed in the body member, the toxicant applicator and the body member defining a passage of predetermined dimensions such that an insect which enters the body member or feeds on the bait therein contacts the toxicant applicator so that a toxicant substance is applied to the insect.

18 Claims, 4 Drawing Sheets

INSECT BAIT STATION AND METHOD OF TREATING INSECTS WITH TOXICANT

FIELD OF INVENTION

The present invention relates generally to insect bait stations, and, more specifically, to an insect bait station which is constructed in such a way that an insect entering the bait station and/or feeding within the bait station will contact a toxicant applicator and have a quantity of a toxicant applied to the insect. The present invention also relates to an improved method of treating insects with a toxicant by applying the toxicant to the insect within an insect bait station.

BACKGROUND OF THE INVENTION

Various types of devices have been known in the prior art for destroying insects. In some devices, the insects are trapped in the device after entering, either by mechanical construction or by sticking to a gummy substance. In either instance, the device is soon full and useless. In devices which contain a poison, it is relatively easy to shake out loose poison, or to probe through openings to reach the poison, thus making them dangerous to children and domestic animals.

In order to attract insects into an insect destroying device, it is necessary to include an insect attractant or bait, such as a food or a pheromone used in conjunction with a food. The insect attractant of prior art devices is typically blended with an insect toxicant so that the insect will be encouraged to ingest the toxicant when it feeds on the attractant. However, many toxicants have a flavor which is distasteful or repellent to the insect thereby discouraging the insect from ingesting the toxicant. The flavor of the toxicant can, in some instances, mask the attractant aspect of the bait. Therefore, a toxicant and a bait sometimes have opposite effects on insects. Therefore, it is sometimes necessary to use special baits, increased amounts of baits or feeding stimulants to overcome the undesirable effect of the toxicant with which the bait is mixed.

Examples of prior art insect destroying devices can be found in U.S. Pat. Nos. 552,644; 1,573,278; 1,887,771; 2,837,861; 4,823,506; 4,841,669; 4,761,912; 4,793,093; 4,837,969; 4,563,836; 4,485,582; 4,563,836; 5,033,229; 5,057,315; and 5,057,316.

Thus, there is a need in the art for an insect destroying device in which the toxicant is securely contained within the device. There is also a need in the art for an insect destroying device in which the insect attractant and the toxicant do not have opposite or competing effects upon the target insect. Furthermore, there is a need in the art for an insect destroying device in which the toxicant is more efficiently applied to an insect and/or subsequently spread to other members of an insect colony.

SUMMARY OF THE INVENTION

The present invention satisfies the above-described needs by providing an improved insect bait station comprising a body member, the body member defining a bait area within the body member and an opening in the body member so that insects can enter the body member and feed on an attractant bait in the bait area. The insect bait station further comprises a toxicant applicator disposed in the body member, the toxicant applicator and the body member defining a passage of predetermined dimensions such that an insect which enters the body member and/or feeds on the bait therein contacts the toxicant applicator so that a quantity of a toxicant substance is applied to the insect.

In an alternate embodiment, the insect bait station of the present invention comprises a body member, the body member defining a bait area within the body member and an opening in the body member so that insects can enter the body member and feed on an attractant bait in the bait area. The insect bait station further comprises a toxicant applicator disposed in the body member, the toxicant applicator and the body member defining a passage of predetermined dimensions such that an insect which enters the body member and/or feeds on the bait contacts the toxicant applicator so that a quantity of a toxicant substance is applied to the insect, the toxicant applicator comprising a selectively breakable reservoir for the toxicant and an absorbent member for wicking the toxicant from the reservoir and for contacting the insect The present invention also comprises an improved method of treating an insect with a toxicant comprising the steps of providing an insect bait station in an area infested with insects to be treated, the bait station comprising a body member defining a bait area within the body member and an opening such that an insect outside of said bait station can reach the bait area through the opening, the insect bait station also comprising a toxicant applicator disposed in the body member and an attractant bait for the insect in the bait area. The toxicant applicator at least partially defines a passageway through which the insect must pass between the opening and the bait area such that the insect contacts the toxicant applicator when inside the body member. The method further comprises the step of permitting an insect to enter the opening of the bait station such that a quantity of a toxicant is applied to the insect by the toxicant applicator when the insect contacts the toxicant applicator.

Accordingly, it is an object of the present invention to provide an improved insect bait station and an improved method of applying a toxicant to an insect.

Another object of the present invention is to provide an insect bait station and a method of treating an insect with a toxicant wherein the toxicant used to treat the target insect is not mixed with the attractant bait contained therein so that the attractant aspects of the bait are not adversely affected by the toxicant.

A further object of the present invention is to provide an insect bait station in which the toxicant is confined within the bait station and will not fall out of the bait station.

Yet another object of the present invention is to provide an insect bait station in which the toxicant does not have to be compatible with the attractant bait contained therein.

Still another object of the present invention is to provide an insect bait station in which insects can be selectively treated with a toxicant based upon size of the insect A further object of the present invention is to provide an insect bait station which is relatively inexpensive to manufacture.

These and other objects, features and advantages of the present invention will become apparent after a review of the following detailed description of the disclosed embodiments and the appended drawing and claims.

DETAILED DESCRIPTION OF THE DISCLOSED EMBODIMENTS

Figure 1:
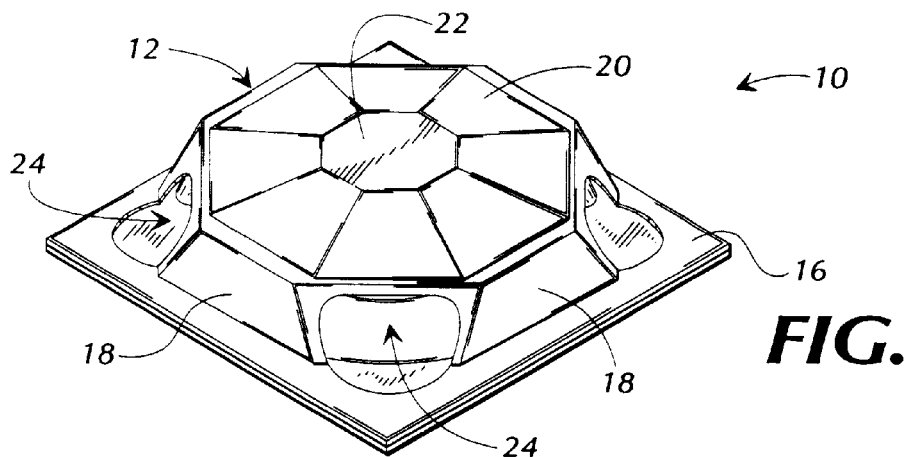
FIG. 1 is a perspective view of a disclosed embodiment of the insect bait station of the present invention.
Figure 2:
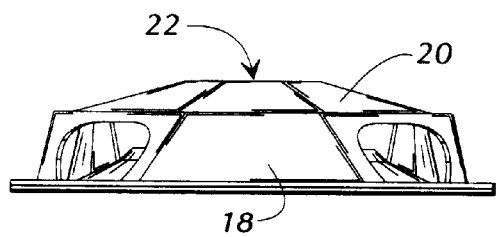
FIG. 2 is a side view of the insect bait station disclosed in FIG. 1.
Figure 3:
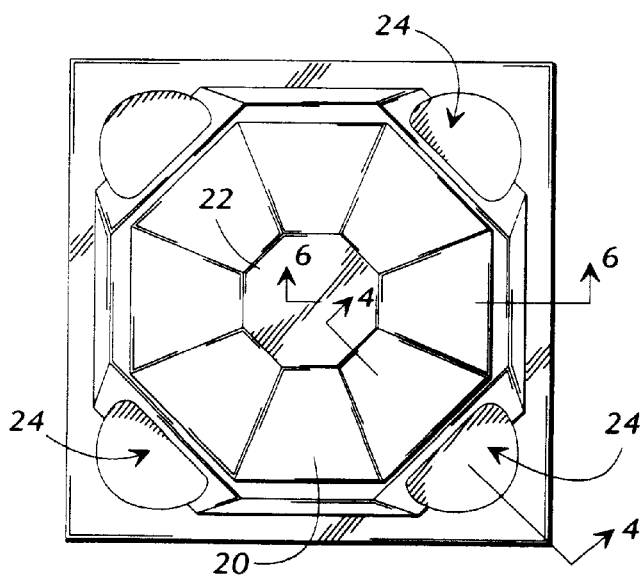
FIG. 3 is a top plan view of the insect bait station disclosed in FIG. 1.
Figure 7:
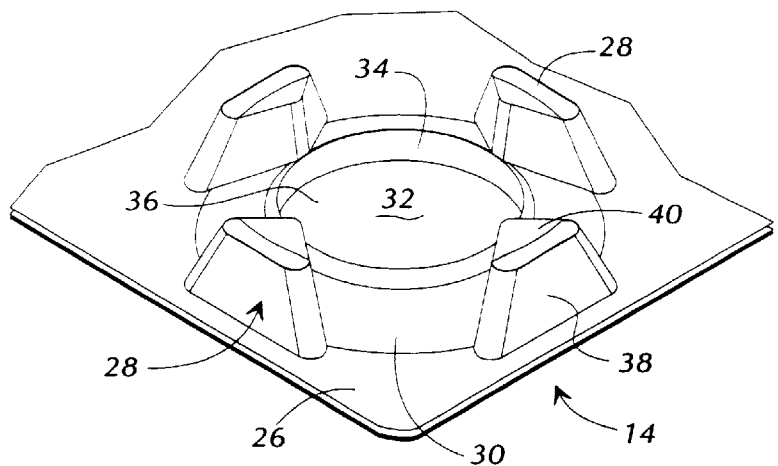
FIG. 7 is a perspective view of the bottom section of the insect bait station disclosed in FIG. 1 shown with the top section removed.
Figure 8:
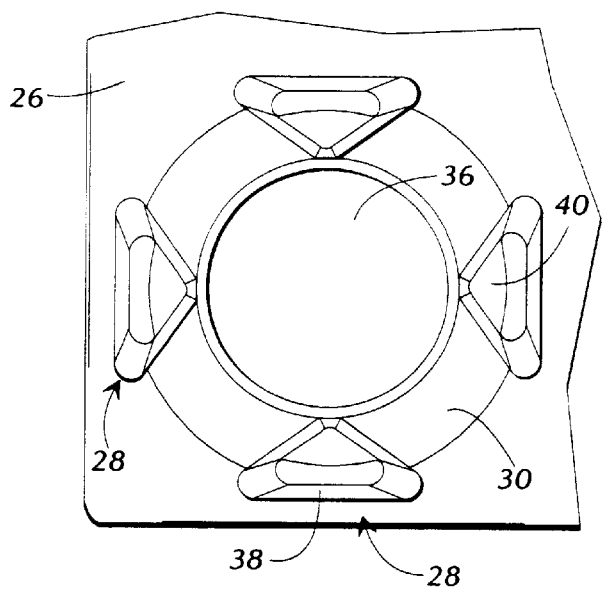
FIG. 8 is a top plan view of the bottom section of the insect bait station disclosed in FIG. 7.
Figure 9:
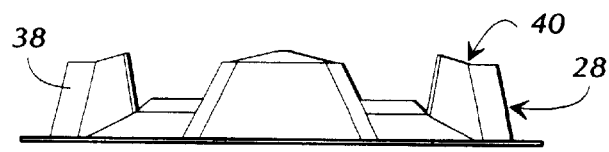
FIG. 9 is a side view of the bottom section of the insect bait station disclosed in FIG. 7.

With reference to the drawing in which like numbers indicate like elements throughout the several views, it can be seen that there is an improved insect bait station. With reference to FIG. 1 there is illustrated an insect bait station 10 comprised of a top portion 12 and a base portion 14 (FIG. 7). The top portion 12 and the base portion 14 interfit to form a hollow body or enclosure. The top portion 12 and the base portion 14 are preferably each made from a single sheet of plastic, such as polyvinyl chloride, which has been molded to a desired shape, such as by vacuum forming. The particular material from which the top portion 12 and the base portion 14 are made is not critical to the present invention and other suitable materials will be apparent to those skilled in the art.

The top portion 12 comprises a flat peripheral flange 16 and eight upstanding wall sections 18 arranged in an octagonal configuration. Extending inwardly from the top of each wall section 18 is a slanted roof section 20 which together terminate in a single centrally located dome section 22. In at least one of the wall sections 18, and preferably in four of the wall sections, is formed an opening 24.

Figure 6:
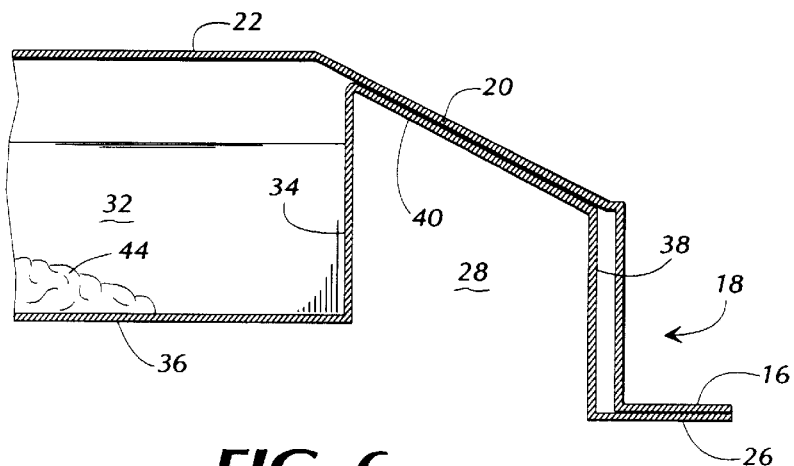
FIG. 6 is a cross-sectional view of the insect bait station shown in FIG. 3 taken along the line 6—6.

The base portion 14 comprises a flat peripheral flange 26 and four upstanding triangular-shaped posts 28 arranged at equally spaced intervals around an annularly-shaped, upwardly-inclined ramp 30. Disposed in the center of the annular ramp 30 is a bait well 32. The bait well 32 includes a generally circular well wall 34 and a well floor 36. Each of the posts 28 comprises a post wall 38 and a slanted post top section 40. The slant of the post top section 40 matches the slant of the roof sections 20 so that the two pieces abut when the top portion 12 and the bottom portion 14 are interfit. When the post top section 40 abuts the roof sections 20 as shown in FIG. 6, the post 28 provides support for the roof section and dome 22.

Figure 4:
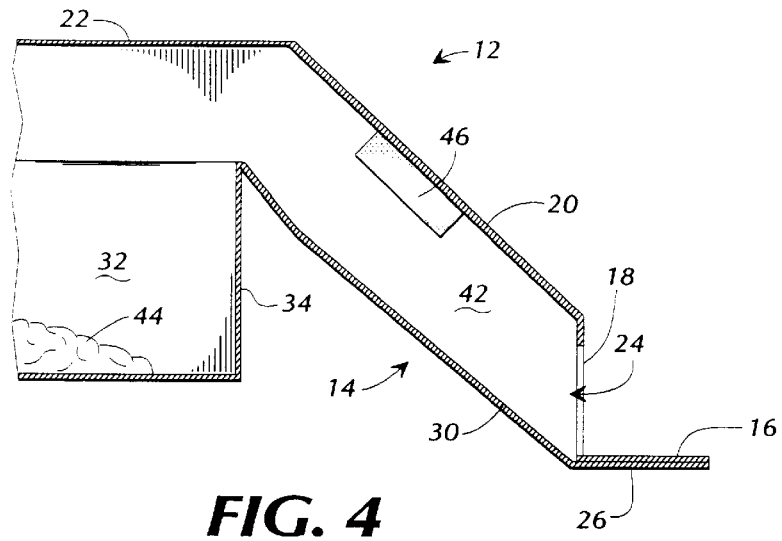
FIG. 4 is a cross-sectional view of the insect bait station shown in FIG. 3 taken along the line 4—4.
Figure 5:
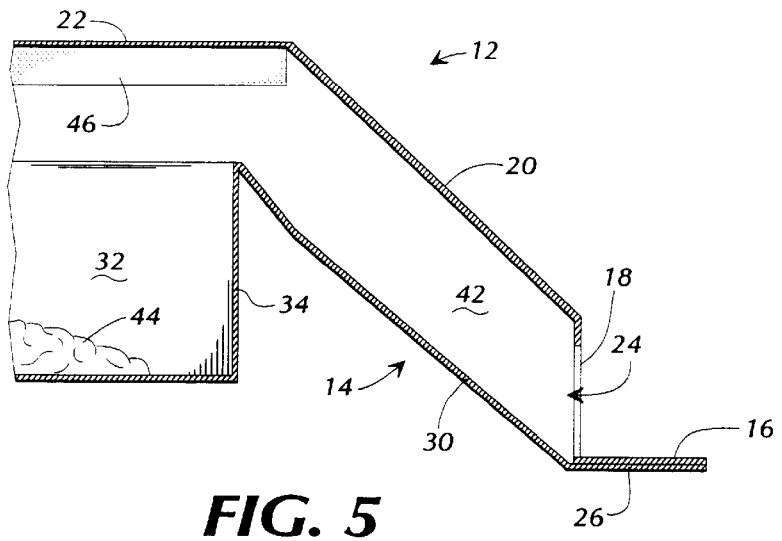
FIG. 5 is a cross-sectional view of an alternate disclosed embodiment of the insect bait station shown in FIG. 4.

The roof section 20 of the top portion 12 and the ramp 30 of the base portion 14 define therebetween an upwardly-slanted passageway 42 (FIGS. 4 and 5). Each of the passageways 42 is aligned with the corresponding opening 24 in the top portion 12. The opening 24 and the passageway 42 provide a path for an insect on the outside of the bait station 10 to enter the bait station and reach an insect attractant or bait 44 disposed in the bait well 32.

Disposed within the passageway 42 on the roof section 20 is a toxicant applicator 46 (FIG. 4). The toxicant applicator 46 can be attached to the roof section 20 by any suitable means, such as by an adhesive. The toxicant applicator 46 is pretreated with a substance which is toxic to the target insect for which the insect bait station 10 is designed. Furthermore, the opening 24 is of a size such that only insects smaller than the opening can enter the insect bait station 10. Similarly, the passageway 42 is of a size such that only insects smaller than the passageway can enter the insect bait station 10. It is specifically contemplated that the size of the opening 24 and the size of the passageway 42 are selected to selectively control the size of the insect which can enter the insect bait station. For a particular target insect, the size of the opening 24 and the passageway 42 are selected so that when the insect enters the bait station 10 through the passageway, the insect will contact the toxicant applicator 46 and a quantity of the toxicant with which the toxicant applicator is treated will be applied to the body of the insect as it passes the toxicant applicator. By matching the size of the passageway 42 to the size of the target insect, it will be appreciated that the insect must contact the toxicant applicator 46 whenever it enters and exits the insect bait station.

The toxicant applicator 46 can be made of any suitable material which can be treated with a toxicant which is selected for the target insect and which will release a quantity of the toxicant when the target insect contacts the toxicant applicator. Suitable materials for the toxicant applicator include absorbent materials or impregnatable materials, such as, natural and synthetic woven and nonwoven fibers, such as porous polyethylene, porous polypropylene, porous polyester, Nomex®, paper, pressed cellulose fibers, cardboard, rayon, cotton, felt, pressed sawdust; natural and synthetic foam rubbers, such as neoprene or latex foam rubber; and polyurethane foam. It is particularly preferred that the toxicant applicator be made of a material which has wicking characteristics or capillary action so that the toxicant will be continuously transported to the surface of the toxicant applicator where it will be available for application to the insect which contacts it, such as a pad of foam rubber latex, such as is found in cosmetic pads. The toxicant applicator can also be made of a solid material, such as solid neoprene rubber. If a solid toxicant applicator is used, the toxicant can be adsorbed or otherwise coated on the exterior surface of the toxicant applicator.

The toxicant which is used is also not critical to the present invention except to the extent that the toxicant should not be repellent to the target insect. Therefore, contact-type poisons and ingestion-type poisons are suitable for use in the present invention. The particular type of poison which is used on the toxicant applicator will depend on the particular target insect. Examples of contact-type poisons which can be used in the present invention include chlorpyrifos, propoxur, isofenphos, acephate, carbamates, organophosphates, chlorinated hydrocarbon insecticides, any pyrethroids which are not repellent, insect growth regulators, such as diflubenzuron, fenoxycarb and lufenuron, and mixtures thereof. Ingestion-type poisons are useful in the present invention even though they are applied to the body of the insect because the poisons will be ingested during grooming by the target insect and/or by other insects within the target insect's colony. Examples of ingestion-type poisons which can be used in the present invention include sulfluramid, hydramethylnon, imidacloprid, boric acid, sodium borate, avermectins, fenitrothion, fenthion, hexaflumuron, fenoxycarb, methoprene, hydroprene, and diflubenzuron. In addition to poisons, it is also contemplated that the toxicant applicator can be treated with fungi spores. Fungi spores are known to kill insects by infection followed by cuticular penetration. Examples of fungi spores which can be used in the present invention include Metarhizium and Beauveria. Other contact-type poisons, ingestiontype poisons and fungi spores which can be used to destroy the target insects will be apparent to those skilled in the art.

It is particularly preferred that the toxicant which is used in the present invention be a delayed-action toxicant. It is desirable that the target insect be treated with the toxicant in the insect bait station, but that the insect not be killed immediately by the toxicant. It is preferred that the toxicant not kill the target insect until the target insect has had sufficient time to return to its nest or colony so that the toxicant can be transferred to other members of the target insect population. Delayed-action toxicants are well known to those skilled in the art. However, delayed-action toxicants which are useful in the present invention include sulfluramid, hexaflumuron, and avermectins. A particularly preferred delayed-action toxicant useful in the present invention is the perfluorinated insecticide disclosed in U.S. Pat. No. 4,929,696 the disclosure of which is incorporated herein by reference. That particularly preferred toxicant is a compound having the structure:

$$R_fSO_2A$$

wherein R is a fluoroaliphatic radical containing up to 20 carbon atoms and A is a structurally compatible residue, or agriculturly acceptable salts thereof.

The toxicants which are useful in the present invention can be in either liquid, gel, paste, solid or encapsulated form. If the toxicant is in a flowable form, such as liquid, gel or paste form, it can be absorbed onto the toxicant applicator, coated or otherwise impregnated into the applicator using methods well known to those skilled in the art. If the toxicant is a solid, it can be combined with a liquid carrier, such as in a solution, dispersion or emulsion. The liquid carrier can then be adsorbed, coated or impregnated onto the toxicant applicator. The liquid carrier can then be optionally evaporated leaving the solid toxicant behind as a coating on the toxicant applicator. Other methods of applying the toxicant to the toxicant applicator will be apparent to those skilled in the art.

The particular bait which is used in the present invention is not critical and will depend on the particular target insect. Generally, the bait should attract the target insect so that the target insect will enter the insect bait station and be drawn to the bait 44 in the bait well 32. Many such baits are well known to those skilled in the art and include pheromones (e g., n-heptyl butyrate and Periplanone B), substances which possess food odors (including food materials), such as fats, oils, proteins, corn glutin, soy protein, carbohydrates, starches, sugars (e.g., dextrose, fructose, maltose, sucrose, and molasses), water and mixtures thereof. A particularly preferred insect attractant useful in the present invention is a sugar-based gel.

The present invention is considered particularly novel because it does not require that the toxicant and the attractant bait be mixed together. By separating the toxicant and the bait, the adverse effects of some toxicants, such as bad taste, do not interfere or compete with the attractantcy of the bait. This make it possible to use toxicants in the present invention which otherwise would be too unpalatable to induce insects to ingest them. This also permits the use of toxicants at higher concentrations than would otherwise be possible if it were required to mix the toxicant with the bait. Furthermore, the attractant bait can be used more efficiently to attract insects to the bait station since the bait does not have to overcome any repellency which the toxicant might possess.

Use of the insect bait station of the present invention will now be considered. The insect bait station 10 is assembled by placing the bait 44 in the bait well 32. The toxicant is then added to the toxicant applicator 46 and adhered to the roof section 20 and section 22. If the toxicant applicator 46 is pretreated with the toxicant, the toxicant applicator can be adhered to the roof section 20. The top portion 12 is then interfit with the base section 14. The top portion 12 and bottom portion 14 can be designed so that they are retained in their interfitting position by a snap fit or they can be adhered together, such as with an adhesive, bonding or spot welding, such as by radio-frequency and ultrasonic welding, around the peripheral flange of both the top portion and the bottom portion.

The assembled insect bait station is then placed in an area infested or frequented by the target insect. Although the present invention is intended to be useful in destroying all types of insects, it is contemplated that the present invention is particularly useful to destroy crawling insects, such as ants, cockroaches and termites. In the case of ants, the insect bait station can be placed adjacent an ant hill; in the case of cockroaches, the insect bait station can be placed on the floor or a counter of a kitchen.

When a target insect gets sufficiently close to the insect bait station 10, it is attracted thereto by the bait 44. The insect enters the insect bait station through one of the openings 24 and crawls up the passageway 42 toward the bait 44. The size of the passageway 42 is selected such that when the insect passes the toxicant applicator 46 the insect's body contacts the applicator and a quantity of toxicant is thereby transferred from the toxicant applicator to the insect's body. After contacting the toxicant applicator 46, the insect will either continue on to the bait 44 or will withdraw from the bait station. If the insect continues on to the bait 44, it will again contact the toxicant applicator 46 when the insect exits the bait station by crawling down the passageway 42 and exiting the opening 24.

If the toxicant is a fast-acting contact-type poison, the insect will be killed shortly after contact with the toxicant applicator 46. If the toxicant is an ingestion-type poison, the insect will not be killed until it ingests the poison, such as by grooming its body. In this respect, an ingestion-type poison will display at least some delayed-action because it will not become effective until it is ingested by the insect during grooming. If the insect is a social insect, such as an ant, wasp, termite or a cockroach, after exiting the insect bait station 10, the insect will return to its nest, colony or harbourage. As a result, at least some of the toxicant will be transferred from the treated insect to other members of the insect colony either by mutual grooming or by grooming by the treated insect followed by trophallaxis, cannibalism, coprophagy or by other purposeful or incidental insect interaction.

With reference to FIG. 5, there is shown an alternate embodiment of the present invention. As can be seen from this drawing, the toxicant applicator 46 is attached to the dome section 22 of the top portion (FIG. 5) rather than being attached to the roof section 20 (FIG. 4). However, in this alternate embodiment, the result is still the same. When the insect enters the bait well 32, it contacts the toxicant applicator 46 when the insect reaches the top of the passageway 42. By placing the toxicant applicator 46 in this position, there is less chance of a child being able to reach the toxicant applicator with a finger extended into the opening 24. Therefore, this configuration is preferred.

Figure 10:
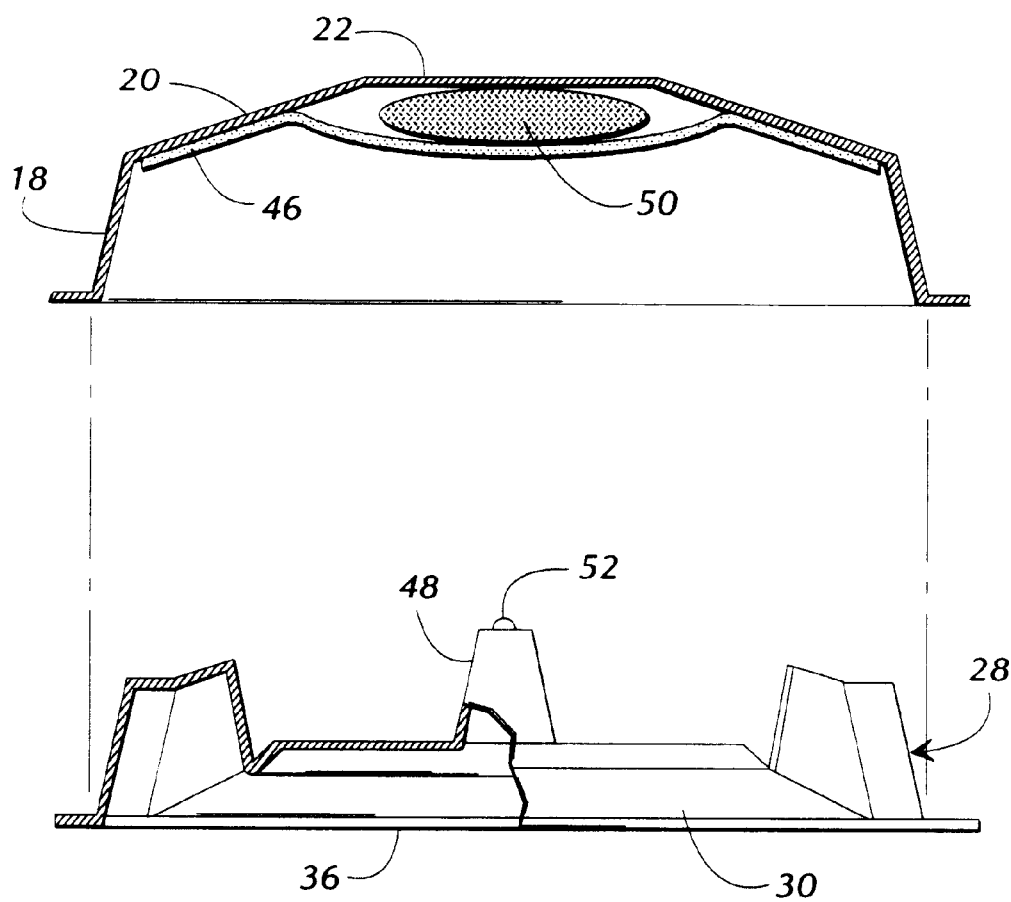
FIG. 10 is an exploded side view of an alternate disclosed embodiment of the insect bait station shown in FIG. 1 shown with the top portion in cross-section and the bottom section in partial cutaway.

With reference to FIG. 10, another alternate embodiment of the present invention is shown. As can be seen from this drawing, a post 48 extends upwardly from the floor 36 of the bait well 32. Disposed between the toxicant applicator 46 and the dome section 22 of the top portion 12 is a breakable toxicant reservoir 50. The breakable reservoir 50 is positioned directly above the post 48 in the bait well 32. The post 48 is equipped with a relatively sharp point 52 which is capable of penetrating the toxicant applicator 46 and contacting the breakable reservoir when the top portion 12 and the base portion 14 are squeezed together, such as between the thumb and forefinger. The breakable reservoir 50 is made of a liquid-proof material, such as a thin plastic (e.g., polyethylene) or metal foil (e.g., aluminum foil). The material from which the breakable reservoir is made is such that when the point 52 of the post 48 contacts the reservoir, it punctures a hole (not shown) in the reservoir and permits the liquid contained therein to leak out of the reservoir onto the toxicant applicator 46. By placing the toxicant in the breakable reservoir 50, the toxicant applicator 46 is not treated with the toxicant until the insect bait station is ready to use. This feature provides the insect bait station with greater safety and longer shelf life.

It should be understood, of course, that the foregoing relates only to certain disclosed embodiments of the present invention and that numerous modifications or alterations may be made therein without departing from the spirit and scope of the invention as set forth in the appended claims.

What is claimed is:

1. An insect bait station comprising:
    a base member and a top member, said base member and said top member interfitiing together to form an at least partially hollow body;
    said base member comprising an elevated well, a ramp leading to said well and a plurality of support members;
    said top member comprising upstanding wall sections and sloped roof sections, said wall section defining at least one opening;
    said top member and said base member interfitting together such that an insect can enter said bait station through said opening and climb said ramp to said well;
    said sloped roof section of said top member and said ramp defining a passageway of a predetermined dimension through which said insect can pass, said passageway including a toxicant applicator, said passageway dimensions and said applicator being disposed in said passageway such that an insect will contact said toxicant applicator such that a quantity of a toxicant is applied to said insect as said insect traverses said ramp to said well; and
    said toxicant applicator comprising a selectively breakable reservoir for said toxicant and an absorbent member.

2. The insect bait station of claim 1, wherein said toxicant substance is selected from the group of contact toxicants, ingestion toxicants, insect growth regulators, fungi spores and mixtures thereof.

3. The insect bait station of claim 1 further comprising a bait substance in said well.

4. The insect bait station of claim 3, wherein said bait comprises an insect attractant pheromone.

5. An insect bait station comprising:
    an at least partially hollow body member, said body member defining a bait area within said body member and an opening in said body member so that insects can enter said body member and feed on an attractant bait in said bait area;
    a toxicant applicator disposed in said body member, said toxicant applicator and said body member defining a passage of predetermined dimensions such that an insect which enters said body member and feeds on said bait contacts said toxicant applicator and a quantity of a toxicant substance is applied to said insect; and
    said toxicant applicator comprising a selectively breakable reservoir for said toxicant and an absorbent member.

6. The insect bait station of claim 5, wherein said toxicant substance is selected from the group of contact toxicants, ingestion toxicants, insect growth regulators, fungi spores and mixtures thereof.

7. An insect bait station comprising:
    a body member, said body member defining a bait area within said body member and an opening in said body member so that insects can enter said body member and feed on an attractant bait in said bait area; and
    a toxicant applicator disposed in said body member, said toxicant applicator and said body member defining a passage of predetermined dimensions such that an insect which enters said body member and feeds on said bait contacts said toxicant applicator so that a toxicant substance is applied to said insect, said toxicant applicator comprising a selectively breakable reservoir for said toxicant and an absorbent member.

8. The insect bait station of claim 7, wherein said absorbent member has wicking characteristics so that said toxicant substance in said breakable reservoir is transported by capillary action from said reservoir to the surface of said absorbent member.

9. The insect bait station of claim 7, further comprising a puncturing member associated with said body for selectively breaking said reservoir to release said toxicant therefrom onto said absorbent member.

10. The insect bait station of claim 9, wherein said puncture member and said reservoir are operatively associated with said body member so that said puncture member will break said reservoir when said body member is squeezed.

11. A method of treating insects with a toxicant comprising the step of:
    providing an insect bait station in an area infested with insects to be treated, said bait station comprising a body member defining a bait area within said body member and an opening such that an insect outside of said bait station can reach said bait area through said opening, said insect bait station also comprising a toxicant applicator disposed in said body member and an attractant bait for said insect in said bait area, said toxicant applicator at least partially defining a passageway through which said insect must pass between said opening and said bait area such that said insect contacts said toxicant applicator when inside said body member, said toxicant applicator comprising a selectively breakable reservoir for said toxicant and an absorbent member;
    breaking said reservoir so as to release said toxicant onto said absorbent member; and
    permitting an insect to enter said opening of said bait station such that a quantity of a toxicant is applied to said insect by said toxicant applicator when said insect contacts said toxicant applicator.

12. The method of claim 11, wherein said toxicant is selected from the group consisting of contact toxicants, ingestion toxicants, fungi spores and mixtures thereof.

13. The method of claim 11, wherein said toxicant is selected from the group consisting of chlorpyrifos, propoxur, isofenphos, acephate, carbamates, organophosphates, chlorinated hydrocarbon insecticides, nonrepellent pyrethroids, insect growth regulators, sulfluramid, hydramethylnon, imidacloprid, boric acid, sodium borate, avermectins, fenitrothion, fenthion, hexaflumuron, fenoxycarb, methoprene, hydroprene, diflubenzuron, Metarhizium, and Beauveria.

14. The method of claim 11, wherein said toxicant is a compound of the structure:

$$R_fSO_2A$$

wherein R is a fluoroaliphatic radical containing up to 20 carbon atoms and A is a structurally compatible residue, or agriculturally acceptable salts thereof.

15. A method of treating insects with a toxicant comprising the step of:

applying a toxicant to an absorbent member disposed in an insect bait station by breaking a breakable reservoir for said toxicant, said breakable reservoir being operatively associated with said absorbent member so that toxicant in said reservoir will be applied to said absorbent member, said bait station comprising a body member defining a bait area within said body member and an opening such that an insect outside of said bait station can reach said bait area through said opening, said absorbent member at least partially defining a passageway through which said insect must pass between said opening and said bait area such that said insect contacts said absorbent member when inside said body member;

providing said insect bait station in an area infested with insects to be treated; and permitting an insect to enter said opening of said bait station such that a quantity of said toxicant is applied to said insect by said absorbent member when said insect enters said bait station, exits said bait station and/or feeds on said attractant bait in said bait area in said bait station.

16. The insect bait station of claim 1, further comprising a puncture member operatively associated with said base member so that said puncture member will break said reservoir when said base member and said top member are squeezed.

17. An insect bait station comprising:

a body member, said body member defining a bait area within said body member and an opening in said body member so that insects can enter said body member and feed on an attractant bait in said bait area;

a selectively breakable reservoir for a toxicant; and an absorbent member in fluid communication with said breakable reservoir, said absorbent member being disposed in said body member such that an insect which enters said body member and feeds on said bait will contact said absorbent member so that a quantity of toxicant is applied to said insect.

18. A method of treating insects with a toxicant comprising the step of:

applying a toxicant to an absorbent member disposed in an insect bait station by breaking a breakable reservoir for said toxicant, said breakable reservoir being in fluid communication with said absorbent member, said bait station comprising a body member defining a bait area within said body member and an opening such that an insect outside of said bait station can reach said bait area through said opening, said absorbent member being disposed in said body member such that a quantity of said toxicant is applied to said insect by said absorbent member when said insect enters said bait station, exits said bait station and/or feeds on said attractant bait in said bait area; and providing said insect bait station in an area infested with insects to be treated.

* * * * *